(No Model.)

C. G. SMITH & L. PFINGST.
LAMP FOR ELECTRIC RAILWAY CARS.

No. 448,865. Patented Mar. 24, 1891.

Witnesses:
J. Stail
Chas. H. Smith

Inventors:
Charles Gordon Smith
Louis Pfingst
per Lemuel W. Serrell atty

UNITED STATES PATENT OFFICE.

CHARLES G. SMITH, OF BROOKLYN, NEW YORK, AND LOUIS PFINGST, OF BOSTON, MASSACHUSETTS.

LAMP FOR ELECTRIC-RAILWAY CARS.

SPECIFICATION forming part of Letters Patent No. 448,865, dated March 24, 1891.

Application filed February 26, 1890. Serial No. 341,864. (No model.)

*To all whom it may concern:*

Be it known that we, CHARLES GORDON SMITH, of Brooklyn, in the county of Kings and State of New York, and LOUIS PFINGST, of Boston, in the county of Suffolk and State of Massachusetts, both citizens of the United States, have invented an Improvement in Lamps for Electric-Railway Cars, of which the following is a specification.

Cars for electric street-railways have heretofore been made in which the current is caused to pass through incandescent lamps at various places upon the car; but difficulty has been experienced in cars of this character because it often happens that such cars have to be stopped and the current temporarily turned off, in which case at night the car is left in darkness.

Our present invention relates to the combination of devices hereinafter described, whereby a street-railway car having a lamp or reflector at the under side of the roof is provided with incandescent lamps that can be availed of under ordinary circumstances for lighting the car, so that the reflector and supports for lamp become also the reflector and the supports for the incandescent electric lamps. Hence the ordinary lamp is in position ready for use at any time that the electric current may be turned off from the incandescent lamps.

Figure 1:
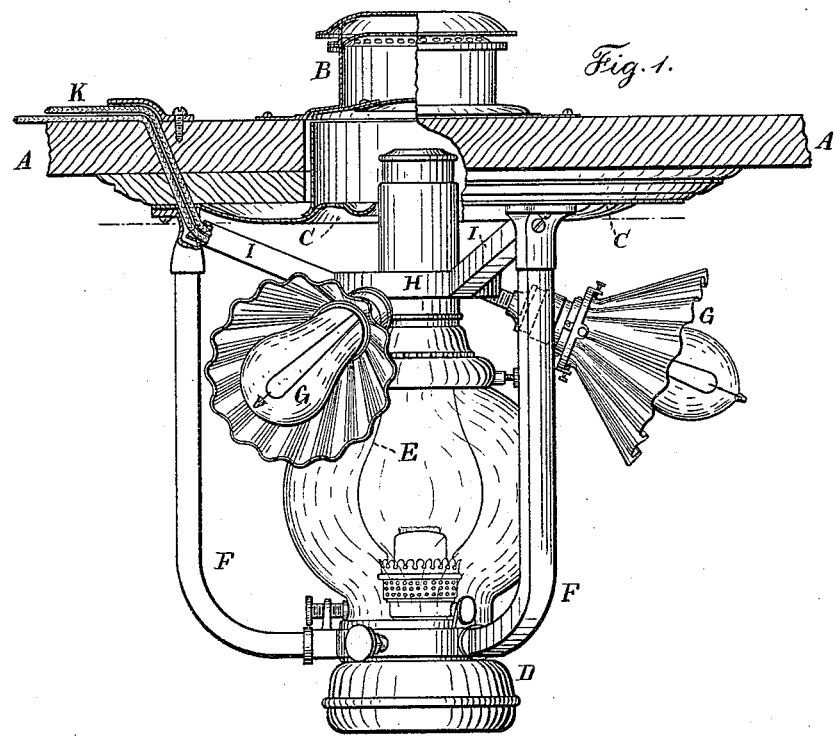
Figure 2:
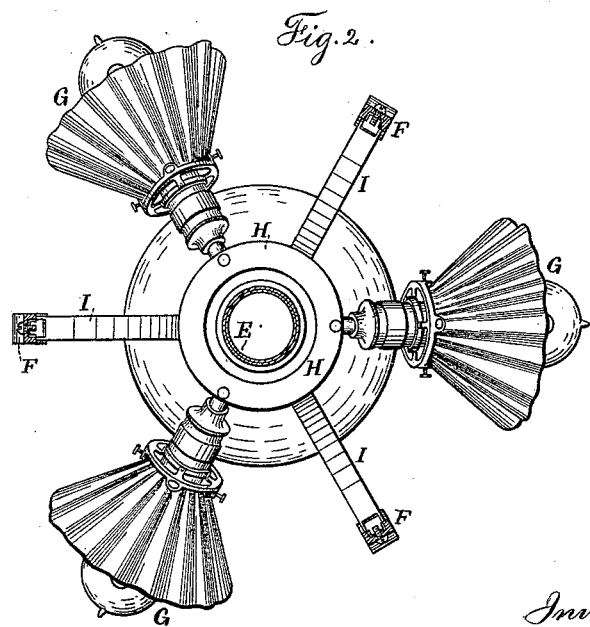

In the drawings, Figure 1 is an elevation of the lamp and a partial section of the reflector, and Fig. 2 is a sectional plan below the reflector.

A portion of the roof of the car is represented at A, and through this is an opening provided with a cap B, and upon the under side of the roof around the opening is a reflector C. The lamp D is adapted to burn kerosene or other oil, and it is provided with a chimney E, passing up into the opening in the roof, and below the cap B and the body of the lamp is supported by the hanging ornamental frames F, the upper ends of which are connected to the roof of the car at the reflector. The incandescent lamps G are arranged around the chimney E at a sufficient elevation not to cast an objectionable shadow when the lamp D is lighted; and these incandescent lamps being below the reflector C, said reflector is as well adapted to act with the incandescent lamps as it is with the lamp D, and the ring H around the chimney E, with its hollow arms I extending to the hanging frames F, forms the necessary supports for the incandescent lamps, and the wires or conductors K leading to the electric lamps pass down through the roof of the car and through the hollow arms I and the ring H to the respective incandescent lamps. Hence the conductors are incased and out of sight, and the lamps are firmly supported and are not liable to injury even when exposed to the violent agitation sometimes given to street-cars in passing obstructions, or in cases where the car runs off the track.

It will be apparent that the shape and size of the reflector and of the oil-lamp and hanging frames may be varied without changing the essential feature of the present invention, and either the electric lights may be in action, or the lamp D, or both, may be in use at the same time.

We claim as our invention—

The combination, in an electric-railway car, of the reflector connected to the roof at an opening through the roof, a cap above the opening, a lamp and hanging frames extending from the reflector to the lamp, a hollow ring around the lamp-chimney, and hollow arms extending from the ring to the hanging frames, electric conductors passing through the hollow arms and ring, and incandescent electric lamps connected to and supported by such ring, substantially as set forth.

Signed by us this 7th day of February, 1890.

CHAS. G. SMITH.
LOUIS PFINGST.

Witnesses:
A. C. ALLEN,
O. M. SHAW,
K. DURFEE.